US010882600B2

(12) United States Patent
Sugaki

(10) Patent No.: US 10,882,600 B2
(45) Date of Patent: Jan. 5, 2021

(54) FOLDABLE UNMANNED AERIAL VEHICLE

(71) Applicant: PRODRONE CO., LTD., Nagoya (JP)

(72) Inventor: Kiyokazu Sugaki, Nagoya (JP)

(73) Assignee: PRODRONE CO., LTD., Nagoya (JP)

( * ) Notice: Subject to any disclaimer, the term of this patent is extended or adjusted under 35 U.S.C. 154(b) by 0 days.

(21) Appl. No.: 16/617,065

(22) PCT Filed: Oct. 22, 2018

(86) PCT No.: PCT/JP2018/039150
§ 371 (c)(1),
(2) Date: Nov. 26, 2019

(87) PCT Pub. No.: WO2019/107009
PCT Pub. Date: Jun. 6, 2019

(65) Prior Publication Data
US 2020/0269965 A1    Aug. 27, 2020

(30) Foreign Application Priority Data

Nov. 30, 2017    (JP) .................................. 2017-229747

(51) Int. Cl.
*B64C 1/30* (2006.01)
*B64C 27/37* (2006.01)
*B64C 39/02* (2006.01)

(52) U.S. Cl.
CPC ............... *B64C 1/30* (2013.01); *B64C 27/37* (2013.01); *B64C 39/024* (2013.01); *B64C 2201/027* (2013.01)

(58) Field of Classification Search
CPC ......... B64C 1/30; B64C 27/37; B64C 39/024; B64C 2201/027
See application file for complete search history.

(56) References Cited

U.S. PATENT DOCUMENTS

2012/0083945 A1*  4/2012  Oakley .................. B64C 25/52
                                                              701/2
2017/0043870 A1*  2/2017  Wu ........................ B64D 47/08
(Continued)

FOREIGN PATENT DOCUMENTS

CN        106477024 A      3/2017
JP        2016-064768 A    4/2016
WO        2017/183551 A1   10/2017

OTHER PUBLICATIONS

Jan. 15, 2019 International Search Report issued in International Patent Application No. PCT/JP2018/039150.

*Primary Examiner* — Assres H Woldemaryam
(74) *Attorney, Agent, or Firm* — Oliff PLC

(57) ABSTRACT

An unmanned aerial vehicle having an airframe whose horizontal dimension is efficiently reduced. This object is solved by an unmanned aerial vehicle that includes: a rotor; an arm; and an arm connector. The arm connector includes an arm holder that is a fixing member holding a part of the arm in a longitudinal direction of the arm. The part of the arm held by the arm holder is changeable by sliding the arm in the longitudinal direction of the arm relative to the arm holder. The arm holder is a movable member movable in directions in which the arm is turned upward and downward and/or rightward and leftward. The object is also solved by an unmanned aerial vehicle that includes: a rotor; an arm; and an arm connector. The arm is provided with a hinge on which the arm is foldable at a middle portion of the arm.

6 Claims, 9 Drawing Sheets

(56) References Cited

U.S. PATENT DOCUMENTS

2017/0217571 A1* 8/2017 Deng ................. B64C 25/10
2019/0112025 A1 4/2019 Sugaki et al.

* cited by examiner

FOLDABLE UNMANNED AERIAL VEHICLE

TECHNICAL FIELD

The present invention relates to an unmanned aerial vehicle technique, and particularly relates to a technique of storing an unmanned aerial vehicle.

BACKGROUND ART

Conventional small-size unmanned aerial vehicles represented by industrial unmanned helicopters have had airframes too expensive to be affordable. Also, these vehicles used to require skillful pilotage for stable flight. In recent years, however, there have been considerable improvements in sensors and software used to control posture of unmanned aerial vehicles and to implement autonomous flight of unmanned aerial vehicles. This has led to considerable improvement in manipulability of unmanned aerial vehicles and availability of high-end airframes at lower prices. Under the circumstances, multi-copters, especially small size multi-copters, are nowadays not only used for hobbyist purposes but also applied to various missions in a wide range of fields.

Patent literature 1 below discloses a multi-copter having foldable arms.

CITATION LIST

Patent Literature

PTL1: JP 2016-064768A

SUMMARY OF INVENTION

Technical Problem

In some multi-copter applications such as in transportation services, a large number of multi-copters are used. A problem that such services face is how to store multi-copters in a space efficiently. A typical multi-copter has such a structure that a plurality of arms radially extend from a center of the airframe of the multi-copter and that rotors are mounted on leading ends of the respective arms. These arms and rotors make up a large part of a horizontal dimension of the airframe, which is seen as a factor that degrades space efficiency in storing the multi-copter. In light of this, it is possible to attach or detach the arms every time the multi-copter is stored or used. This, however, is not considered as an efficient way of operating the multi-copter.

In light of the above-described problems, an object to be accomplished by the present invention is to provide an unmanned aerial vehicle having an airframe whose horizontal dimension is efficiently reduced.

Solution to Problem

In order to solve the above-described problem, an unmanned aerial vehicle according to the present invention includes: a rotor including a rotary wing; a bar-shaped arm supporting the rotor; and an arm connector to which the arm is connected. The arm connector includes an arm holder that is a fixing member holding a part of the arm in a longitudinal direction of the arm. The part of the arm held by the arm holder is changeable by sliding the arm in the longitudinal direction of the arm relative to the arm holder. The arm holder is a movable member movable in directions in which the arm is turned upward and downward and/or rightward and leftward.

In a structure in which the arm supporting the rotor is foldable at a base end portion of the arm, the length between the movable part (base end portion) of the arm and a leading end portion of the arm is the same as the total length of the arm. With this structure, when, for example, the height of the skids (legs) of the airframe is smaller than the total length of the arm, the leading end portion of the folded arm interferes with the ground or a floor surface. Thus, an unmanned aerial vehicle cannot be stored with its arm folded vertically. Also, when the outer shape of a center frame (hub to which the arm is connected) is smaller than the length of the arm, only a limited space-saving effect is provided even if the arm is folded horizontally along the center frame. In light of the considerations above, an arm holder that is a movable member is mounted on the arm connector so that the arm holder supports the arm and the arm is slidable in its longitudinal direction relative to the arm holder. This shortens the length between the movable part (arm holder) and the leading end portion of the arm (and the rear end portion of the arm protruding from the arm holder). This ensures that even in such an example application in which the height of the skids is shorter than the total length of the arm, the arm can be arranged vertically, and that even in such an example application in which the arm is arranged horizontally along the center frame, a maximized space-saving effect is provided.

Preferably, a range over which the arm holder is configured to turn the arm upward and downward has an upper limit defined by a development position of the arm in flight.

While an unmanned aerial vehicle is making a flight, the arm supporting the rotor is inclined upward by the rotor. Under the circumstances, if, for example, the arm is insufficiently fixed to the arm holder, it is possible that the arm is unintentionally turned upward while the unmanned aerial vehicle is making a flight. The arm holder of the above-described configuration of the present invention has such a structure that the arm is kept from being turned further upward than the development position in flight. This ensures that the above-described accident is prevented in advance.

The arm connector may include an arm holder support member including a pair of planar members arranged in parallel with each other with the arm holder held between the pair of planar members. Each planar member of the planar members constituting the arm holder support member may include, on a plate surface of the each planar member, an arcuate long hole and an aperture or a boss. The aperture is bored at a center of an imaginary circle including the long hole as an arc. The boss protrudes from the center of the imaginary circle toward the other planar member of the planar members. The long hole of one planar member and the long hole of the other planar member are disposed at positions corresponding to each other. The aperture or the boss of the one planar member and the aperture or the boss of the other planar member are disposed at positions corresponding to each other. Over an angle range defined by the long hole, the arm holder supported by the arm connector may be rotationally movable about a rotational movement center located at a position corresponding to the aperture or the boss.

The arm holder support member supports two points of the arm holder, namely, a rotational movement center of the arm holder (portion corresponding to the position of a hole or a boss) and a reciprocating portion of the arm holder (portion that reciprocates along the long hole). This ensures that the arm holder is stably supported. Then, the orientation angle at which the arm holder is rotationally moved to any one of the ends of the long hole is set to match the orientation angle at which the arm is developed in flight. This increases the accuracy of positioning of the arm at the development time. This also prevents the arm from being unintentionally turned upward while the unmanned aerial vehicle is making a flight.

The each planar member of the planar members constituting the arm holder support member may include, on the plate surface of the each planar member, the arcuate long hole and the aperture bored at the center of the imaginary circle including the long hole as the arc. The long hole of the one planar member and the long hole of the other planar member are disposed at positions corresponding to each other. The aperture of the one planar member and the aperture of the other planar member are disposed at positions corresponding to each other. The arm holder may include: screw holes formed at positions corresponding to the respective long holes; and axis holes formed at positions corresponding to the respective apertures and connecting the apertures to each other. A screw member may be screwed in the screw holes through the long holes. A core bar may pass through the apertures and the axis holes.

In order to solve the above-described problem, an unmanned aerial vehicle according to the present invention includes: a rotor comprising a rotary wing; a bar-shaped arm supporting the rotor; and an arm connector to which the arm is connected. The arm includes a hinge on which the arm is foldable at a middle portion of the arm.

In a structure in which the arm supporting the rotor is foldable at a base end portion of the arm, the length between the movable part (base end portion) of the arm and a leading end portion of the arm is the same as the total length of the arm. With this structure, when, for example, the height of the skids (legs) of the airframe is smaller than the total length of the arm, the leading end portion of the folded arm interferes with the ground or a floor surface. Thus, an unmanned aerial vehicle cannot be stored with its arm folded vertically. Also, when the outer shape of a center frame (hub to which the arm is connected) is smaller than the length of the arm, only a limited space-saving effect is provided even if the arm is folded horizontally along the center frame. That is, that the total length of the arm cannot be shortened serves as a hindrance to the attempt to reduce the horizontal dimension of the airframe. In light of the considerations above, in the present invention, a hinge on which the arm is foldable at its middle portion is provided at an optimal position that is based on the shape of the airframe. This reduces the horizontal dimension of the airframe, efficiently with a simple structure.

Preferably, the arm connector includes an arm holder that is a fixing member holding a part of the arm in a longitudinal direction of the arm. Preferably, the part of the arm held by the arm holder is changeable by sliding the arm in the longitudinal direction of the arm relative to the arm holder.

The arm is slidable in its longitudinal direction relative to the arm holder. This ensures that for example, the arm can be inserted into the arm connector. This reduces the length between the arm holder and the leading end portion of the arm, further increasing the effect of reducing the horizontal dimension of the airframe.

Preferably, the arm is made of a cylindrical pipe material, and the arm includes an arm side fitting member that is a fitting member to prevent the arm from rotating in a circumferential direction. In the longitudinal direction of the arm, the arm has: a leading end portion at which the rotor is disposed; and a rear end portion opposite to the leading end portion. When the arm has been slid to a limit extent in a direction of the leading end portion relative to the arm holder, the arm side fitting member is fitted with a fixation side fitting member that is a fitting member to form a pair with the arm side fitting member.

By fitting the arm side fitting member and the fixation side fitting member together, the rotation of the arm in the circumferential directions is restricted. This prevents the arm from unintentionally rotating in flight. This also increases the accuracy of positioning of the arm at the development time. When this configuration is combined with the hinge, releasing the fitting between the fitting members at the airframe storage time makes the folded arm freely rotatable in the circumferential directions. This ensures that damage to the arm and/or the arm support member is prevented in advance when the arm contacts surrounding objects.

The arm side fitting member may be a pin protruding from the rear end portion of the arm. The pin may protrude in the direction of the leading end portion of the arm in parallel with the arm. The fixation side fitting member may be a pin hole formed in the arm holder.

Advantageous Effects of Invention

Thus, the unmanned aerial vehicle according to the present invention efficiently reduces the horizontal dimension of the airframe. This ensures that for example, a large number of airframes are stored with improved space efficiency.

DESCRIPTION OF EMBODIMENTS

An embodiment of the present invention will be described below by referring to the accompanying drawings. The embodiment that will be described below takes as an example a multi-copter 10, which is an unmanned aerial vehicle provided with a plurality of rotors. The multi-copter 10 is a general-purpose airframe, and there is no particular limitation to the application in which the multi-copter 10 can be used. It is to be noted that the terms "upward", "downward", and "vertical" used in the following description refer to directions parallel to z axis of the coordinate system representation illustrated in FIG. 1, and the direction indicated by the arrow of the z axis corresponds to "upward". Also, the term "horizontal" refers to a direction on the x-y plane of the coordinate system representation.

(Configuration Outline)

Figure 1:
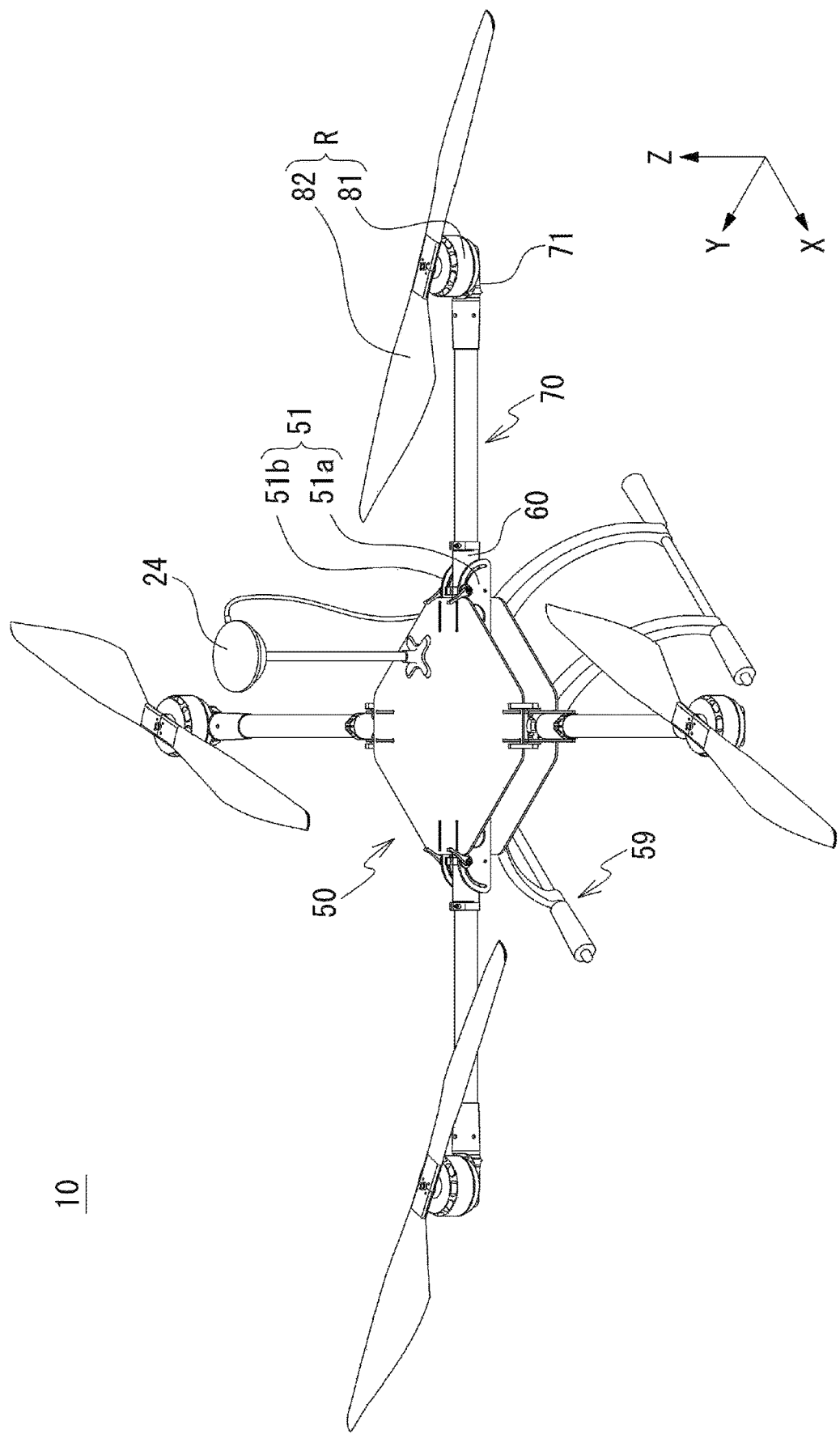
FIG. 1 is a perspective view of an arm orientation of a multi-copter in flight.
Figure 2:
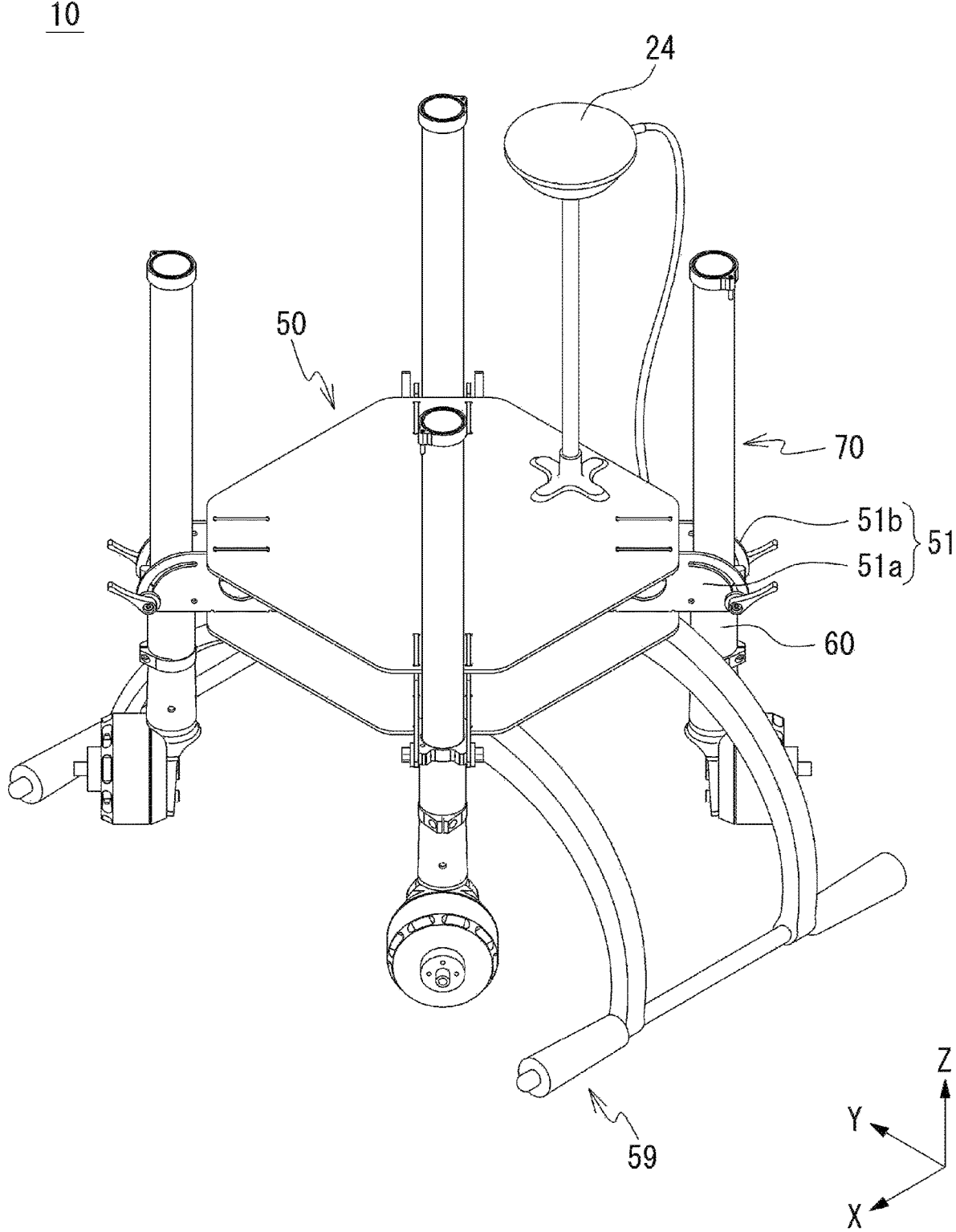
FIG. 2 is a perspective view of an arm orientation of the multi-copter at storage time.

FIGS. 1 and 2 are perspective views of an exterior of the multi-copter 10 according to this embodiment (hereinafter also referred to as "this example"). FIG. 1 illustrates an arm orientation of the multi-copter 10 in flight. FIG. 2 illustrates an arm orientation of the multi-copter 10 at the storage time.

The multi-copter 10 includes: rotors R, each of which includes a propeller 82, which is a rotary wing; bar-shaped arms 70, which support the respective rotors R; and a center frame 50, which is an arm connector to which the arms 70 are connected. Each of the rotors R is screw fixed to a motor mount 71, which is disposed at a leading end portion of the arm 70. The center frame 50 includes arm holders 60. Each of the arm holders 60 is a fixing member to hold part of the corresponding arm 70 in its longitudinal direction. The arm holder 60 of this example is a movable member that is rotationally movable in directions in which the arm 70 is turned upward and downward. The part of the arm 70 held by the arm holder 60 is changeable by sliding the arm 70 in its longitudinal direction relative to the arm holder 60.

The center frame 50 has such a simple structure that two rectangular plates each with severed four corners in plan view are arranged in parallel with each other. Inside the center frame 50, a control system for the airframe is disposed. The arm holders 60 of this example are disposed at positions corresponding to the above-described four corners of the center frame 50. The center frame 50 includes arm holder support members 51. Each of the arm holder support members 51 is made up of a pair of planar members 51a and 51b, which are arranged in parallel with each other with the arm holder 60 held between the pair of planar members 51a and 51b. The arm holder 60 is rotationally movably supported by the arm holder support member 51. The illustrated four groups of the arm holder support member 51, the arm holder 60, the arm 70 supported by the arm holder 60, and the rotor R are all the same in structure. It is to be noted that the arm connector of the present invention will not be limited in form to the center frame 50 of this example. The arm connector according to the present invention is a part of the airframe of unmanned aerial vehicle and may have any other shape and/or structure insofar as the arm connector is a member capable of rotationally movably supporting the arm holder.

As illustrated in FIG. 1, in flight, the arms 70 of the multi-copter 10 are pulled to a maximum extent from the respective arm holders 60 in the directions of the leading end portions of the arms 70, so that the arms 70 are oriented horizontally. The movable range of the arm holder 60 of this example is such that the upper limit is equivalent to the position of the arm 70 illustrated in FIG. 1, and from the upper limit, the arm holder 60 is movable over the range of approximately 90 degrees, at which the leading end portion of the arm 70 is pointed vertically downward.

The multi-copter 10 of this example includes skids 59 (legs). Each of the skids 59 has a height smaller than the total length of the corresponding arm 70. With this configuration, when the arm 70 oriented as illustrated in FIG. 1 is turned downward, the leading end portion of the arm 70 interferes with the ground or a floor surface, preventing the arm 70 from being turned any further to a vertical position. In the multi-copter 10 of this example, the arm 70 is insertable into the arm holder 60. This shortens the length of the arm 70 between the movable part (the arm holder 60) that makes the arm 70 turnable and the leading end portion of the arm 70. This ensures that even when the height of the skid 59 is smaller than the total length of the arm 70, the arm 70 does not interfere with the ground or a floor surface, enabling the arm 70 to stand vertically (see FIG. 2). It is to be noted that the propellers 82 are removed in FIG. 2, and that making the propellers 82 foldable type saves the labor of attaching and detaching the propellers 82.

(Movable Structure of Arm)

Figure 3:
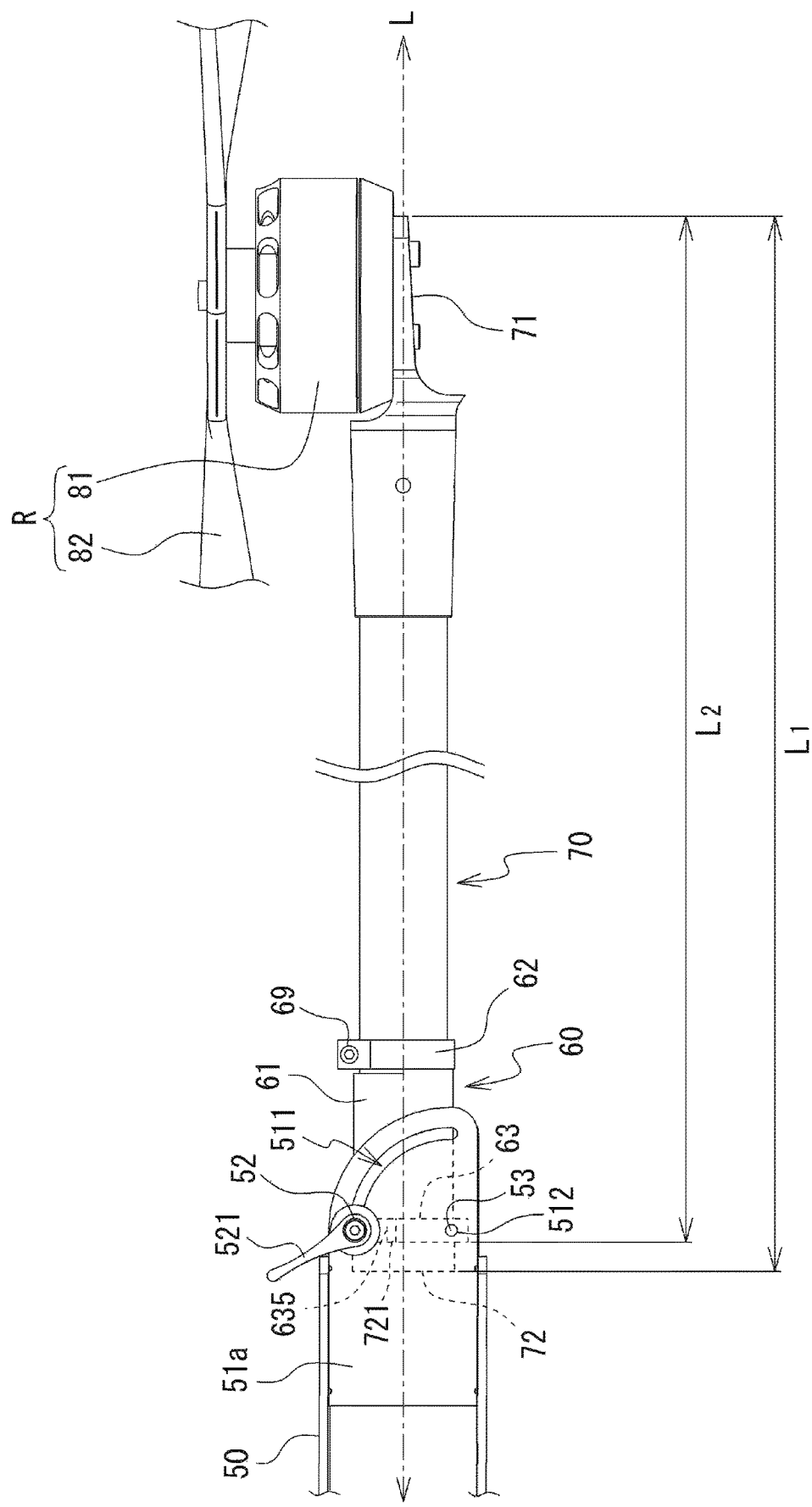
FIG. 3 is a side view of an arm illustrating its movable structure (arm orientation of the multi-copter in flight).
Figure 4:
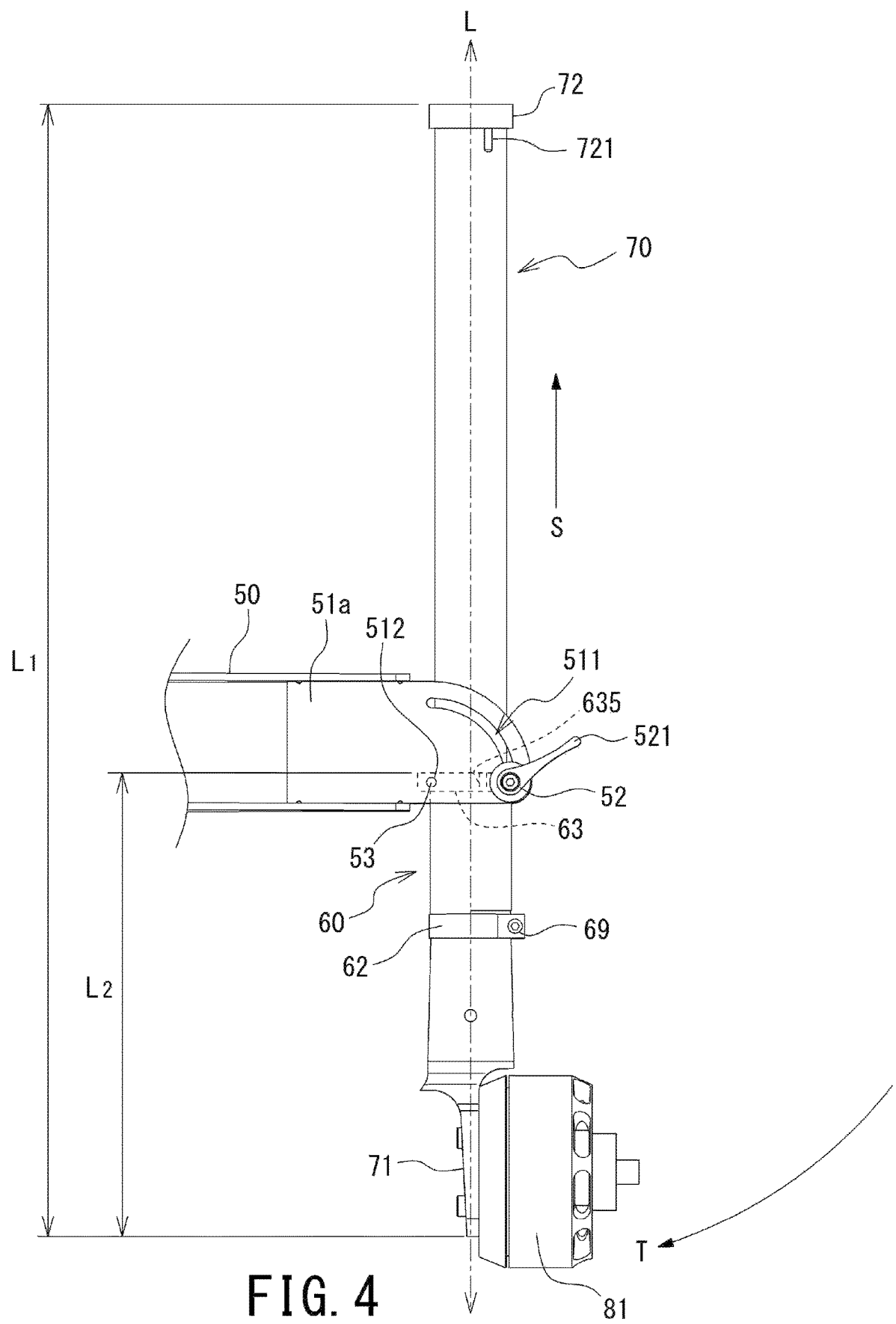
FIG. 4 is another side view of the arm illustrating its movable structure (arm orientation of the multi-copter at the storage time).

FIGS. 3 and 4 are side views of the movable structure of the arm 70. FIG. 3 is a side view of an arm orientation of the multi-copter 10 in flight. FIG. 4 is a side view of an arm orientation of the multi-copter 10 at the storage time.

The arm holder 60 of this example is rotationally movable about a rotational movement center located at the positions of apertures 512 of the arm holder support member 51 (the planar members 51a and 51b). The range of the rotational movement is equivalent to the arcuate angle (approximately 90 degrees) of each long hole 511 of the planar members 51a and 51b. The orientation angle of the arm holder 60 can be changed by loosening the screw members 52, which are screwed together through the long holes 511, and then moving the screw members 52 along the long holes 511.

The arm holder 60 of this example is such that when the screw members 52 are moved to the upper ends of the long holes 511, the arm 70 is developed horizontally. This is the arm orientation of the multi-copter 10 in flight. When the screw members 52 are moved to the lower ends of the long holes 511, the arm 70 is oriented vertically with the leading end portion of the arm 70 pointed downward. While the multi-copter 10 is making a flight, the arm 70 is inclined upward due to the thrust of the rotor R supported by the arm 70. Under the circumstances, if, for example, the arm 70 is insufficiently fixed to the arm holder 60, it is possible that the arm 70 is unintentionally turned upward while the multi-copter 10 is making a flight. The arm holder 60 of this example has such a structure that the arm 70 is kept from being turned further upward than the development position in flight. This ensures that the above-described accident is prevented in advance.

The arm holder 60 of this example is also such that by loosening a screw 69 of a clamp 62 of the arm holder 60, the arm 70 is slidable in its longitudinal direction, L. By inserting the arm 70 into the arm holder 60, a length of L2, which is between the arm holder 60 and the leading end portion of the arm 70, can be shortened, among the total length, L1, of the arm 70. This ensures that the arm 70 can be oriented vertically, without interference of the arm 70 with the ground or a floor surface. By keeping the arm 70 standing vertically, the effect of reducing the horizontal dimension of the multi-copter 10 increases, ensuring that for example, a large number of airframes are stored with improved space efficiency.

The following is a procedure for changing the arm orientation of the multi-copter 10 in flight (FIG. 3) to the arm orientation at the storage time (FIG. 4). First, (1) remove the propeller 82 (the propeller 83 may be a foldable-type propeller). Then, (2) loosen the screw member 52 of the arm holder support member 51 and the screw 69 of the arm holder 60; (3) turn the arm 70 downward (see arrow T); and (4) insert the arm 70 into the arm holder 60 (see arrow S). (3) and (4) of the procedure may be performed simultaneously while ensuring that the leading end portion of the arm 70 is out of contact with the ground or a floor surface, or (3) may be finished first with the multi-copter 10 inclined and then (4) may be performed.

(Rotational Movement Structure of Arm Holder)

Figure 5:
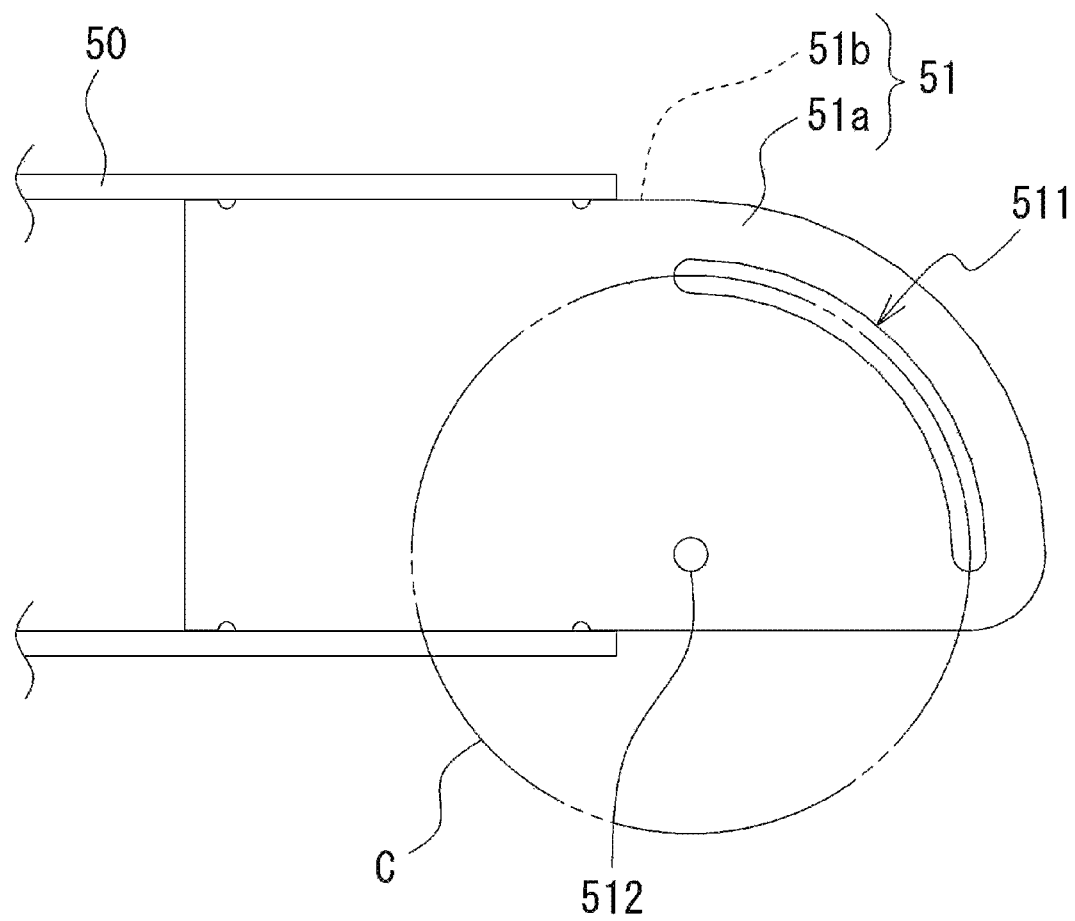
FIG. 5 is a side view of an arm holder support member.
Figure 6A:
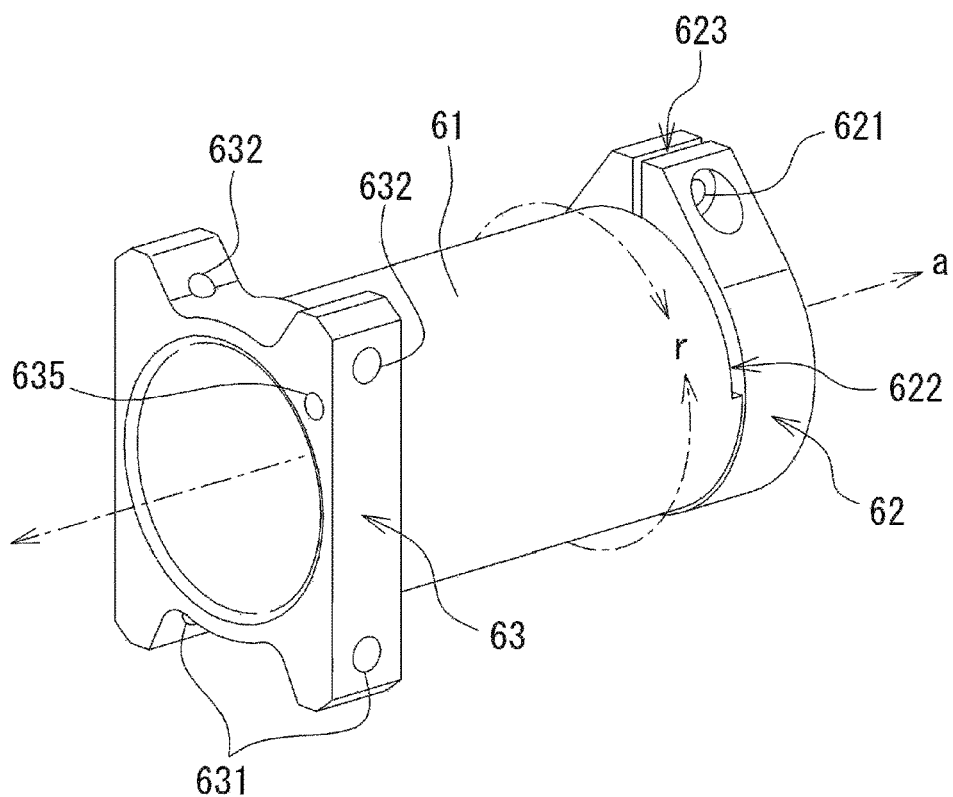
FIG. 6 is a side view and a perspective view of a structure of an arm holder.
Figure 6B:
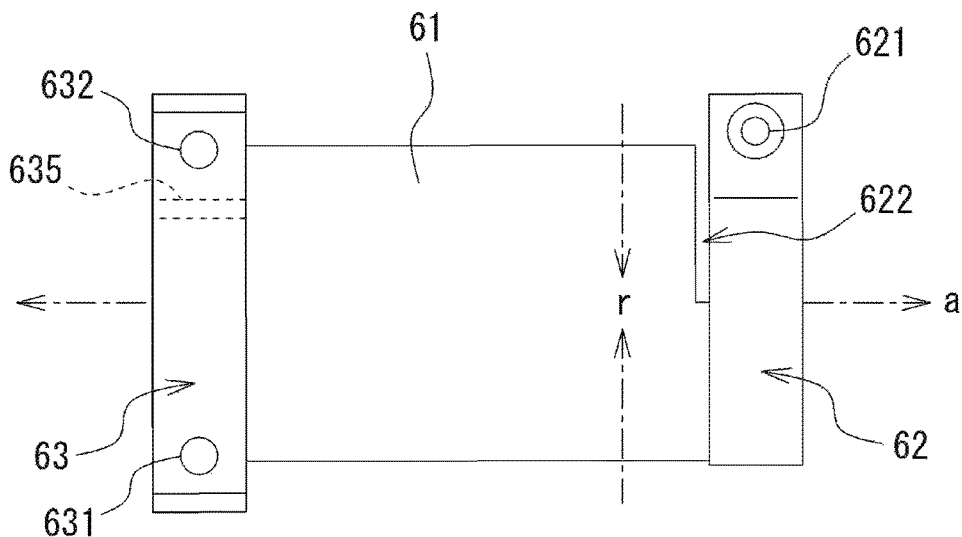

By referring to FIGS. 5 and 6, the structure of the arm holder support member 51 and the structure of the arm holder 60 will be described in detail below. FIG. 5 is a side view of the arm holder support member 51 (planar member 51a). FIG. 6 is a perspective view of the structure of the arm holder 60 (FIG. 6A) and a side view of the structure of the arm holder 60 (FIG. 6B).

As illustrated in FIG. 5, on a plate surface of each of the planar members 51a and 51b, which constitute the arm holder support member 51, the arcuate long hole 511 and the aperture 512 are formed. The aperture 512 is bored at the center of an imaginary circle c, which includes the long hole 511 as an arc. The long holes 511 of the planar members 51a and 51b are disposed at positions corresponding to each other, and the apertures 512 of the planar members 51a and 51b are disposed at positions corresponding to each other.

As illustrated in FIG. 6, the arm holder 60 is a fixing member having an approximately cylindrical shape. The arm holder 60 of this example includes: a cylindrical base 61; the clamp 62, which is a larger diameter portion disposed at one end of the base 61 in its cylinder axis direction a; and a flange 63, which is a larger diameter portion disposed at the other end of the base 61.

The flange 63 has screw holes 632, which are formed at positions corresponding to the long holes 511 of the arm holder support member 51. The flange 63 also has axis holes 631, which are formed at positions corresponding to the apertures 512 of the arm holder support member 51 and which are through holes connecting the apertures 512 to each other. A core bar 53 is passed through the apertures 512 and the axis holes 631. The screw members 52 are screwed in the screw holes 632 of the flange 63 through the long holes 511. The screw member 52 of this example includes a lever 521, with which the screw member 52 can be tightened or loosened without using a tool. This enables the arm holder 60 to rotationally movable about the rotational movement center located at the position of the aperture 512 over the angle range defined by the long hole 511.

The flange 63 also has a pin hole 635, which is an aperture penetrating the flange 63 in the cylinder axis direction a. An object of the pin hole 635 will be described later.

At the boundary between the clamp 62 and the base 61, a first slit 622 is formed. The first slit 622 is a gap that separates the clamp 62 and the base 61 from each other in the cylinder axis direction a. The first slit 622 is formed over an upper half area of the base 61. Also, a second slit 623 is formed at a top portion of the clamp 62. The second slit 623 is a gap that separates the top portion of the clamp 62 in circumferential direction r. In the top portion of the clamp 62, a screw hole 621 is formed. The screw hole 621 penetrates the top portion through the second slit 613. The screw 69 is screwed and fastened in the screw hole 621, causing the clamp 62 to deform such that the inner diameter of the clamp 62 reduces. This causes the arm 70 disposed in the arm holder 60 to be tightened and fixed to the arm holder 60.

Thus, in the multi-copter 10 of this example, the arm holder support member 51 supports two points of the arm holder 60, namely, the rotational movement center (the apertures 512 and the axis holes 631, through which the core bar 53 is passed) and the reciprocating portion (the screw holes 632, in which the screw members 52 are screwed through the long holes 511). This ensures that the arm holder 60 is stably supported. The orientation angle of the arm holder 60 at the time when the screw member 52 is moved to the upper end of the long hole 511 matches the positioning angle of the arm 70 at the development and flight time. This increases the accuracy of positioning of the arm 70 at the development time. It is to be noted that the apertures 512 and the core bar 53 of the arm holder support members 51 may be replaced with bosses that protrude from opposing surfaces of the planar members 51a and 51b toward each other, that is, toward the axis holes 631.

It is to be noted that the arm holder according to the present invention will not be limited in form to the arm holder 60 of this example. The arm holder according to the present invention may have any other shape and/or structure insofar as the arm holder is capable of changing the position at which to hold the arm in its longitudinal direction and is movable in directions in which the arm is turned upward and downward and/or rightward and leftward.

(Rotation Restricting Structure of Arm)

As illustrated in FIGS. 3 and 4, the arm 70 is made of a cylindrical pipe material. Also, the arm 70 includes an arm side fitting member that is a fitting member to prevent the arm 70 from rotating in the circumferential direction. The arm side fitting member of this example is a pin 721, which protrudes from a removal preventing ring 72, which is disposed at the rear end portion of the arm 70. The pin 721 protrudes toward the leading end portion of the arm 70 along and in parallel with the arm 70.

The arm holder 60 includes a fixation side fitting member that is a fitting member to form a pair with the pin 721. The fixation side fitting member of this example is the pin hole 635, which is formed in the flange 63 of the arm holder 60. When the arm 70 is slid relative to the arm holder 60 to a maximum extent to the leading end portion of the arm 70, the pin 721 is fitted in the pin hole 635.

With the pin 721 and the pin hole 635 fitted together, the angle position of the arm 70 of this example in the circumferential direction is fixed. This prevents the arm 70 from rotating unintentionally while the multi-copter 10 is making a flight. This also increases the accuracy of positioning of the arm 70 at the development time. It is to be noted that the fixation side fitting member according to the present invention may not necessarily be provided in the arm holder 60, but may be provided in the arm holder support member 51 or the center frame 50. Also, the arm side fitting member and the fixation side fitting member according to the present invention will not be limited in form to the pin 721 and the pin hole 635, respectively. The arm side fitting member and the fixation side fitting member may have any other shape and/or structure insofar as the members fitted together fixes the angle position of the arm in the circumferential direction. Also, the arm according to the present invention will not be limited in form to the arm 70; for example, the arm may be an arm made of a rectangular cylindrical material or a rectangular bar material.

(Modification)

Figure 7:
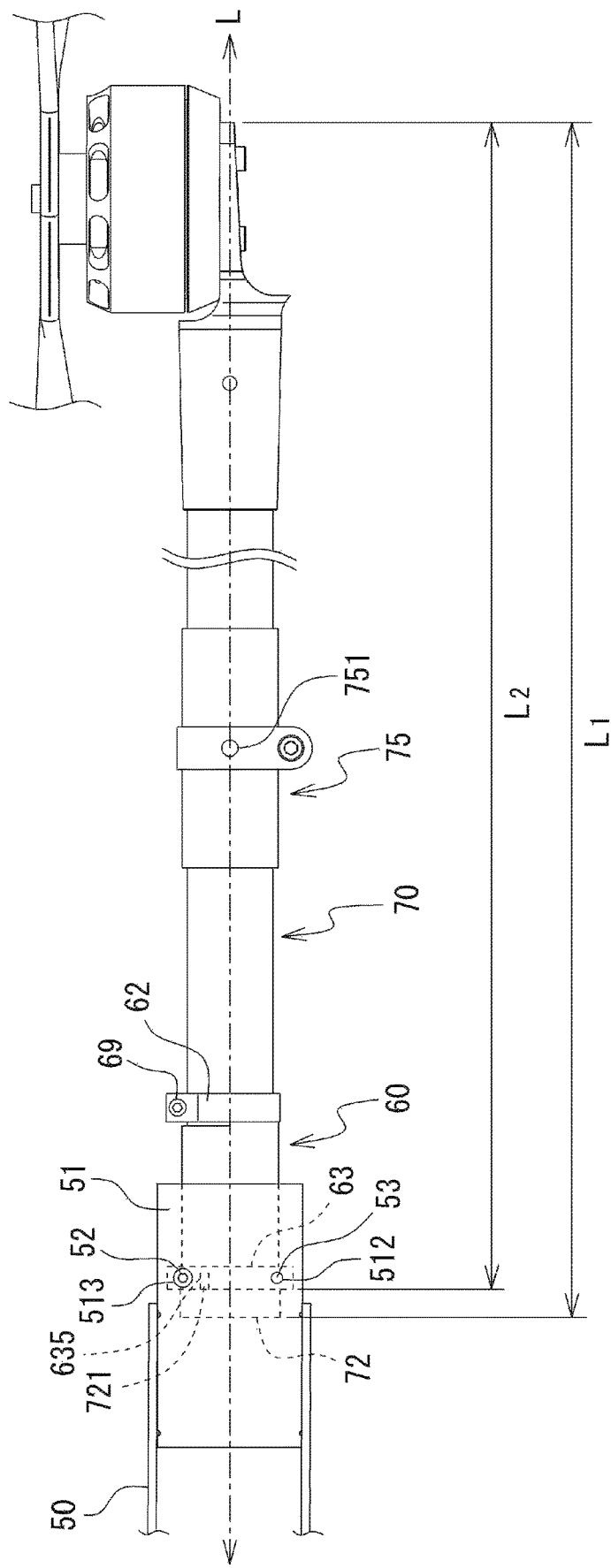
FIG. 7 is a side view of the arm illustrating a modification of the movable structure of the arm (arm orientation of the multi-copter in flight).
Figure 8:
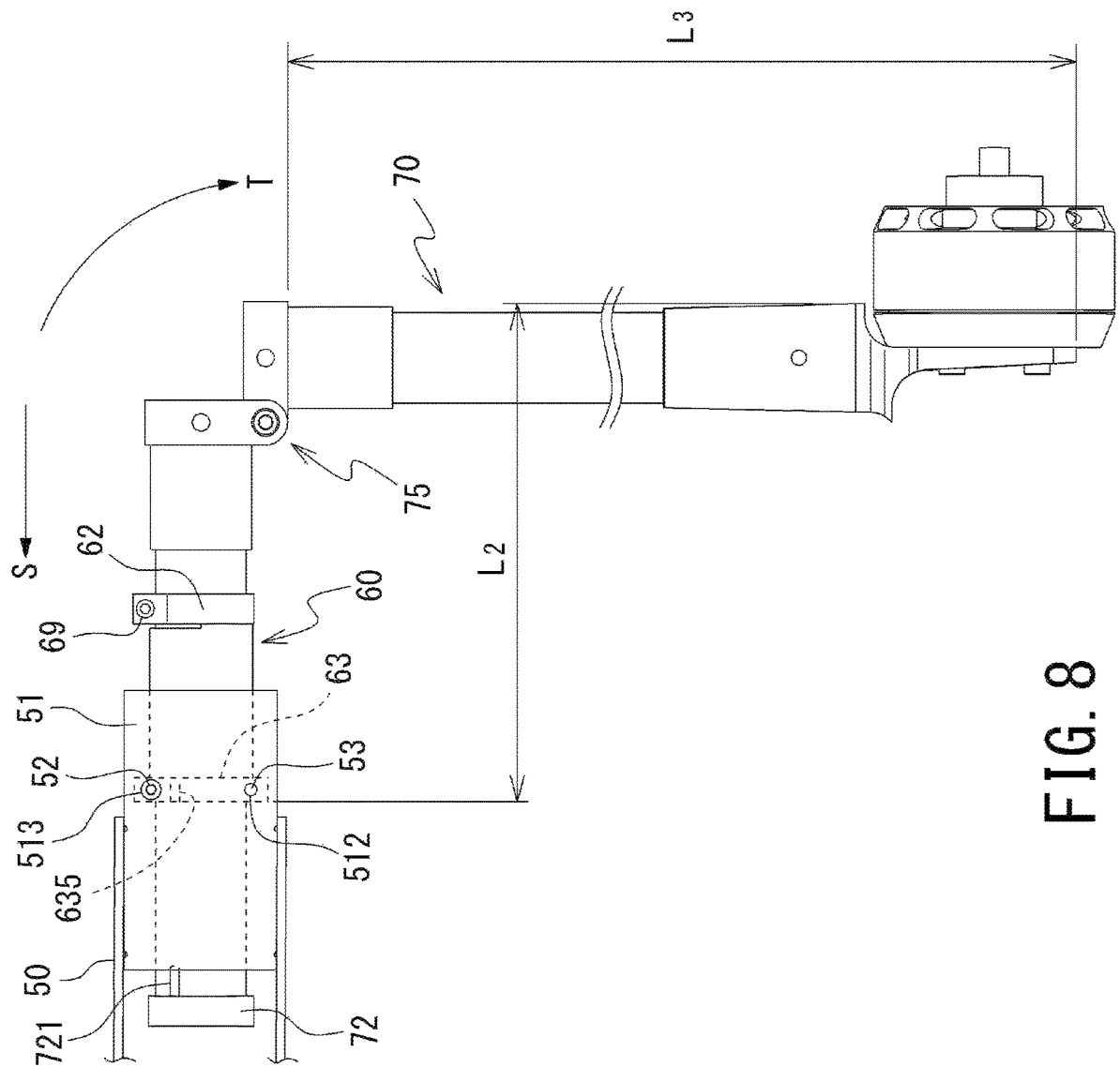
FIG. 8 is a side view of the modification of the movable structure of the arm (arm orientation of the multi-copter at the storage time).

FIGS. 7 and 8 illustrate a modification of the arm movable structure of the multi-copter 10. FIG. 7 is a side view of the arm orientation in flight of the multi-copter 10 according to this modification. FIG. 8 is a side view of the arm orientation at the storage time of the multi-copter 10 according to this modification.

In this modification, the arm holder 60 is fixed to an arm support 51 rotationally unmovably, and the arm 70 is provided with a hinge 75, on which the arm 70 is foldable at its middle portion. Among the total length L1 of the arm 70, length L3 is folded downward. By adjusting the position of the hinge 75 based on, for example, the height of the skid 59, the length L3 of the arm 70 can be folded to such a degree that the length L3 of the arm 70 does not interfere with the ground or a floor surface. In this state, the length L3 of the arm 70 is oriented vertically.

More specifically, in the multi-copter 10 according to this modification, no long holes 511 are formed in the arm support 51; instead, apertures 513 are formed in the arm support 51. The apertures 513 are through holes similar to the apertures 512. The screw members 52 are inserted through the apertures 513 and screwed into the screw holes 632 of the arm holder 60. This ensures the arm holder 60 is fixed unmovably relative to the arm support 51.

The hinge 75 is a typical hinge for pipe material use. The hinge 75 is fixed by a lock pin 751 and is openable and closable by pulling out the lock pin 751. When the lock pin 751 is pulled out, the leading end portion of the arm 70 hangs down under its own weight. By adjusting the position of the hinge 75 in the longitudinal direction L of the arm 70 based on, for example, the height of the skid 59, the length L3 can be adjusted, which is the length over which the leading end portion of the arm 70 hands down. This prevents the arm 70 from contacting the ground or a floor surface.

Also, in the multi-copter 10 according to this modification as well, by loosening the screw 69 of the clamp 62 of the arm holder 60, the arm 70 is slidable in the longitudinal direction L. By inserting the arm 70 into the arm holder 60, a length of L2, which is between the arm holder 60 and a side leading end portion of the arm 70, can be shortened, among the total length L1 of the arm 70 (the outer shape of the rotor R is disregarded here). This further increases the effect of reducing the horizontal dimension of the multi-copter 10.

Also, by inserting the arm 70 into the arm holder 60, the engagement between the pin 721 of the arm 70 and the pin hole 635 of the arm holder 60 is released, making the arm 70 freely rotatable in the circumferential directions. This ensures that if, for example, the hanging-down portion of the arm 70 contacts surrounding objects during transportation or storage of the multi-copter 10, the arm 70 freely rotates to release external force, thereby eliminating or minimizing damage to the hinge 75 and the arm holder support member 51.

(Functional Configuration)

Figure 9:
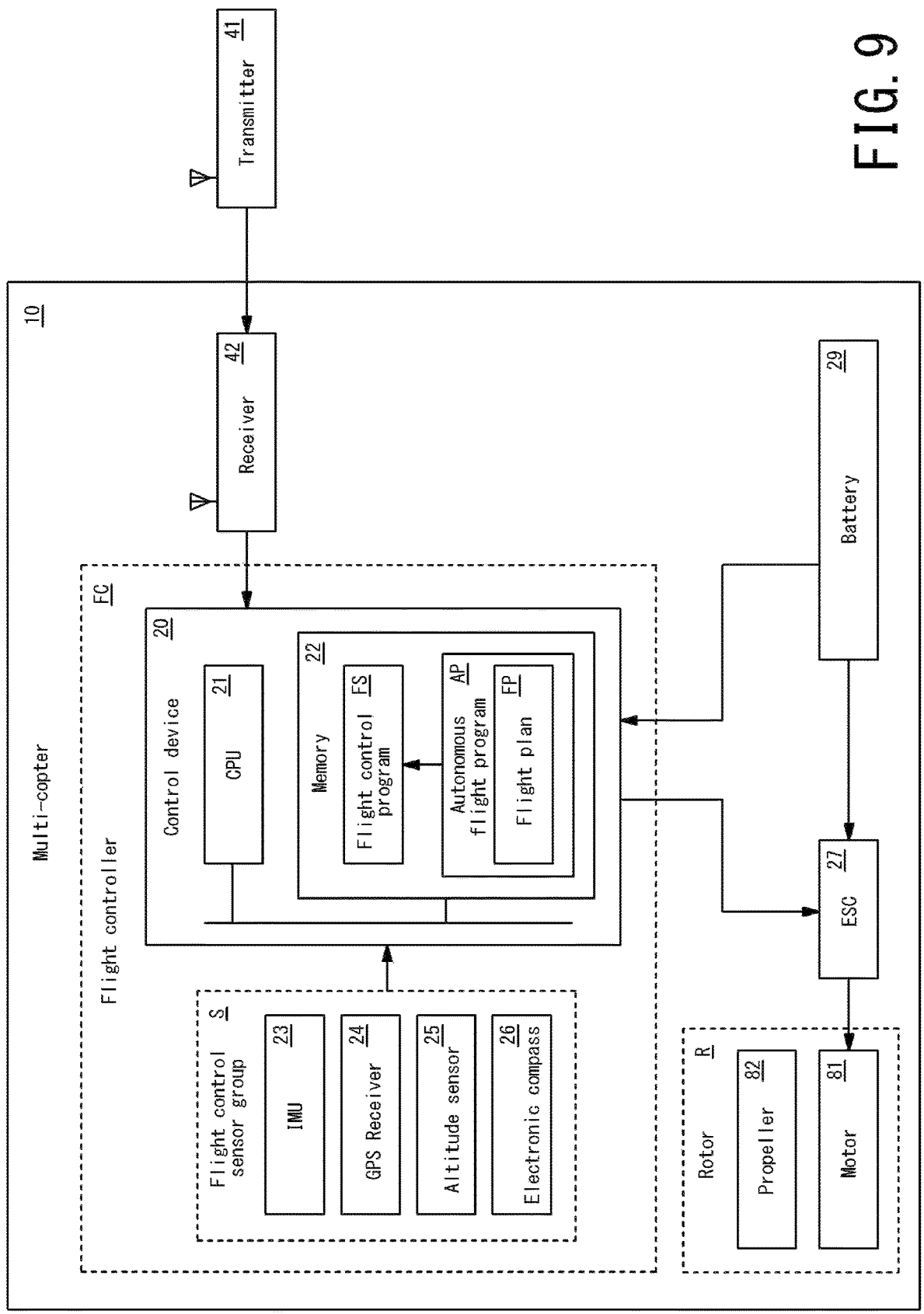
FIG. 9 is a block diagram illustrating a functional configuration of the multi-copter.

FIG. 9 is a block diagram illustrating a functional configuration of the multi-copter 10 of this example. The functions of the multi-copter 10 mainly include: a flight controller FC, which is a controller; four rotors R; the arms 70, which support the respective rotors R; an ESC 27 (Electric Speed Controller), which is a driving circuit for a brushless motor 81 of each of the rotors R; a receiver 42, which receives an operation signal from an operator (transmitter 41); and a battery 29, which supplies power to the foregoing elements.

The flight controller FC includes a control device 20, which is a micro-controller. The control device 20 includes: a CPU 21, which is a central processing unit; and a memory 22, which is a storage such as ROM, RAM, and flash memory.

The flight controller FC further includes a flight control sensor group S, which includes an IMU 23 (Inertial Measurement Unit), a GPS receiver 24, an altitude sensor 25, and an electronic compass 26. These elements are connected to the control device 20.

The IMU 23 is a sensor that detects an inclination of the airframe of the multi-copter 10, and mainly includes a three-axis acceleration sensor and a three-axis angular velocity sensor. A pneumatic sensor is used as the altitude sensor 25 of this example. The altitude sensor 25 calculates, based on an air pressure altitude that has been detected, a sea level altitude (height) of the multi-copter 10. The altitude sensor 25 may be embodied otherwise; for example, a distance measuring sensor utilizing laser, infrared light, or ultrasonic may be used and pointed toward a ground surface to obtain ground altitude. A three-axis geomagnetic sensor is used as the electronic compass 26 of this example. The electronic compass 26 detects the azimuth angle of the airframe nose of the multi-copter 10. The GPS receiver 24 is, in a strict sense, a receiver in Navigation Satellite System (NSS). The GPS receiver 24 obtains current longitude and latitude values from Global Navigation Satellite System (GNSS) or Regional Navigation Satellite System (RNSS). The flight controller FC is capable of obtaining, using the flight control sensor group, position information indicating the position of the airframe including: the inclination of the airframe; the rotation of the airframe; the longitude and latitude of the airframe in flight; the altitude of the airframe in flight; and the azimuth angle of the airframe nose in flight.

It is to be noted that while the flight control sensor group S of this example is configured as outdoor use, the multi-copter 10 may fly indoors. A possible example is that beacons that transmit wireless signals are arranged at predetermined intervals in a facility, and relative distances between the multi-copter 10 and the beacons are measured based on field strengths of the signals received from the beacons so that the position of the multi-copter 10 in the facility is identified. Another possible example is that the multi-copter 10 is provided with a camera that takes images of objects around the multi-copter 10, and the images are subjected to image recognition to detect a characteristic position in a facility so that the position of the multi-copter 10 in the facility is identified based on the characteristic position. Similarly, a distance measuring sensor utilizing laser, infrared light, or ultrasonic may be used to measure the distance between the multi-copter 10 and a floor surface (or a ceiling surface) or a wall surface in a facility so that the position of the multi-copter 10 in the facility is identified.

The control device 20 includes a flight control program FS, which is a program for controlling the posture of the multi-copter 10 during flight and controlling basic flight operations. The flight control program FS adjusts the number of rotations of the individual rotors R based on information obtained from the flight control sensor group S, and causes the multi-copter 10 to fly while correcting the posture and/or position of the airframe of the multi-copter 10.

The control device 20 further includes an autonomous flight program AP, which is a program for causing the multi-copter 10 to fly autonomously. In the memory 22 of the control device 20, a flight plan FP is registered. The flight plan FP includes parameters specifying: longitude and latitude of the destination and/or a transit point of the multi-copter 10; and altitude and/or speed of the multi-copter 10 in flight. The autonomous flight program AP causes the multi-copter 10 to fly autonomously based on the flight plan FP, under the starting condition that an instruction has been transmitted from the transmitter 41 or time has passed to reach a predetermined point of time.

Thus, the multi-copter 10 of this example is an unmanned aerial vehicle having high-level flight control functions. It is to be noted, however, that the rotary wing aerial vehicle according to the present invention will not be limited in form to the multi-copter 10; for example, it is possible to use an airframe with some of the sensors omitted from the flight control sensor group S or use an airframe without an autonomous flight function and capable of flying by manual operation only.

While the embodiments of the present invention have been described hereinbefore, the present invention will not be limited in scope to these embodiments, and numerous modifications and variations are possible without departing from the spirit of the invention. For example, in the above-described embodiment and modification, the space of the multi-copter 10 in the height direction is utilized to reduce the horizontal dimension of the airframe. By utilizing the configuration of the arm, the arm holder, and the arm support according to the present invention, the arm can be folded in the horizontal direction to increase space efficiency.

The invention claimed is:

1. An unmanned aerial vehicle comprising:
a rotor comprising a rotary wing;
a bar-shaped arm supporting the rotor; and
an arm connector to which the arm is connected,
wherein the arm connector comprises an arm holder that is a fixing member holding a part of the arm in a longitudinal direction of the arm,
wherein the part of the arm held by the arm holder is changeable by sliding the arm in the longitudinal direction of the arm relative to the arm holder,
wherein a base end of the arm protrudes from the arm holder when the arm is slid in a direction of the arm holder, the base end being an end of the arm furthest from the rotor, and
wherein the arm holder is a movable member movable in directions in which the arm is turned upward and downward and/or rightward and leftward.

2. The unmanned aerial vehicle according to claim 1, wherein a range over which the arm holder is configured to turn the arm upward and downward has an upper limit defined by a position of the arm in flight.

3. The unmanned aerial vehicle according to claim 1,
wherein the arm connector comprises an arm holder support member comprising a pair of planar members arranged in parallel with each other with the arm holder held between the pair of planar members,
wherein each planar member of the planar members constituting the arm holder support member comprises, on a plate surface of the each planar member,
an arcuate long hole, and
either (i) an aperture bored at a center of an imaginary circle including the long hole as an arc, or (ii) a boss protruding toward the other planar member of the planar members from a center of an imaginary circle including the long hole as an arc, the long hole of one planar member and the long hole of the other planar member being disposed at positions corresponding to each other, the aperture or the boss of the one planar member and the aperture or the boss of the other planar member being disposed at positions corresponding to each other, and
wherein over an angle range defined by the long hole, the arm holder supported by the arm connector is rotationally movable about a rotational movement center located at a position corresponding to the aperture or the boss.

4. The unmanned aerial vehicle according to claim 3,
wherein the each planar member of the planar members constituting the arm holder support member comprises, on the plate surface of the each planar member,
the arcuate long hole, and
the aperture bored at the center of the imaginary circle including the long hole as the arc, the long hole of the one planar member and the long hole of the other planar member being disposed at positions corresponding to each other, the aperture of the one planar member and the aperture of the other planar member being disposed at positions corresponding to each other,
wherein the arm holder comprises
screw holes formed at positions corresponding to the respective long holes, and
axis holes formed at positions corresponding to the respective apertures and connecting the apertures to each other,
wherein a screw member is screwed in the screw holes through the long holes, and
wherein a core bar passes through the apertures and the axis holes.

5. An unmanned aerial vehicle comprising:
a rotor comprising a rotary wing;
an arm supporting the rotor and made of a cylindrical pipe material; and
an arm connector to which the arm is connected,
wherein the arm comprises a hinge on which the arm is foldable at a middle portion of the arm,
wherein the arm connector comprises an arm holder that is a fixing member holding a part of the arm in a longitudinal direction of the arm, and
wherein the part of the arm held by the arm holder is changeable by sliding the arm in the longitudinal direction of the arm relative to the arm holder,
wherein the arm comprises an arm side fitting member that is a fitting member to prevent the arm from rotating in a circumferential direction,
wherein in the longitudinal direction of the arm, the arm has
a leading end portion at which the rotor is disposed, and
a rear end portion opposite to the leading end portion, and
wherein when the arm has been slid to a limit extent in a direction of the leading end portion relative to the arm holder, the arm side fitting member is fitted with a fixation side fitting member that is a fitting member to form a pair with the arm side fitting member.

6. The unmanned aerial vehicle according to claim 5,
wherein the arm side fitting member is a pin protruding from the rear end portion of the arm,
wherein the pin protrudes in the direction of the leading end portion of the arm in parallel with the arm, and
wherein the fixation side fitting member is a pin hole formed in the arm holder.

* * * * *